June 4, 1957 M. B. SAMPSON 2,794,648
COMPENSATING CHUCK
Filed June 29, 1953 3 Sheets-Sheet 1

INVENTOR.
MERRITT B. SAMPSON
BY
RICHEY, WATTS, EDGERTON & McNENNY
B.D.Watts
ATTORNEYS June 4, 1957   M. B. SAMPSON   2,794,648
COMPENSATING CHUCK
Filed June 29, 1953   3 Sheets-Sheet 2

INVENTOR.
MERRITT B. SAMPSON
BY
RICHEY, WATTS, EDGERTON & McNENNY
B. D. Watts
ATTORNEYS June 4, 1957  M. B. SAMPSON  2,794,648
COMPENSATING CHUCK Filed June 29, 1953  3 Sheets-Sheet 3

INVENTOR.
MERRITT B. SAMPSON
BY
RICHEY, WATTS, EDGERTON & McNENNY

ATTORNEYS

United States Patent Office 2,794,648
Patented June 4, 1957

2,794,648

COMPENSATING CHUCK

Merritt B. Sampson, Cleveland, Ohio, assignor to The S-P Manufacturing Corporation, Cleveland, Ohio, a corporation of Ohio Application June 29, 1953, Serial No. 364,580

3 Claims. (Cl. 279—119)

This invention relates to power chucks and, more particularly, to power chucks embodying mechanism to render the chuck capable of compensating for differences in dimensions in the work pieces held therein.

Turning operations on forged cylindrical bodies and similar parts are often difficult and costly since the surface of the work is frequently irregular, out of round, or improperly centered. Such irregularities make it difficult to chuck the parts so they will rotate about their medial axes. The use of a conventional universal chuck with a work piece which is out of round results in one chuck jaw engaging the work before the others, thus causing the part to rotate eccentrically. In order to overcome this difficulty compensating chucks have been developed wherein the first chuck jaw to engage the work piece will come to rest while the remaining jaws continue to move until they engage the surface of the work. The clamping force applied by the jaws on the surface of the work will then be equal while maintaining the work on the desired center. By employing a compensating chuck of this type, it is possible to continuously handle work pieces having dimensions that vary from piece to piece with assurance that the work will rotate about the desired center.

Compensating chucks of the form now in use are unsatisfactory since the jaws tend to separate under the influence of the centrifugal force and release the work. Such condition limits the utility of the chuck to low speed operation and also presents a hazard to the operator or others in the environment of the machine.

The present invention contemplates a structure which is designed to minimize the eccentricity of the compensative parts of the chucking mechanism during operation and also maintain sufficient clamping effect upon the work during high rotative speeds to outweigh the deleterious effects of centrifugal force.

Another object of the invention is to provide a compensating power chuck capable of handling work pieces of varying size and/or surface irregularities which is designed to maintain the compressive effort of the jaws irrespective of wear of the operative parts of the chuck.

A further object of the invention is to provide a compensating power chuck which is operated by a reciprocative sleeve which is disposed in circumambient relation with the rotational axis of the chuck and arranged for transaxial movement relative thereto.

A multi-jaw chuck according to this invention embodies an annular body formed with a bore therein constituting a guideway for a reciprocative sleeve or draw tube. The forward face of the body is formed with a plurality of jaw slides arranged in spaced relation and adapted to move radially toward and away from the axis of rotation of the body. Each jaw slide is provided with a bell crank pivoted in the chuck body and having one end thereof engaged in a recess in the jaw slide and the other end engaged with a cam ring which is moved axially by a sleeve secured to the draw bar mechanism. The cam ring is formed with a tapered land thereon which is disposed to effect the actuation of the bell cranks upon lineal movement of the draw bar and the consequent radial movement of the jaw slides relative the axis of rotation of the body. The angle of the land on the cam ring tends to restrain movement and thus hold the bell cranks when the jaw slides are in the chucking position and tends to lock the jaws against the work piece.

The cam ring is bored to accommodate free transaxial movement between the bore therein and the contiguous body of the sleeve so all of the jaws may move independently to exert equal force on the work piece. Since the cam floats relative to the draw tube, any wear in the cam surface or other operative part of the chucking mechanism will be automatically equalized, thus extending the life of the chuck.

Other objects and advantages, more or less ancillary to the foregoing, and the manner in which all the various objects are realized will appear in the following description which, considered in connection with the accompanying drawings, sets forth the preferred embodiment of the invention.

Figure 1:
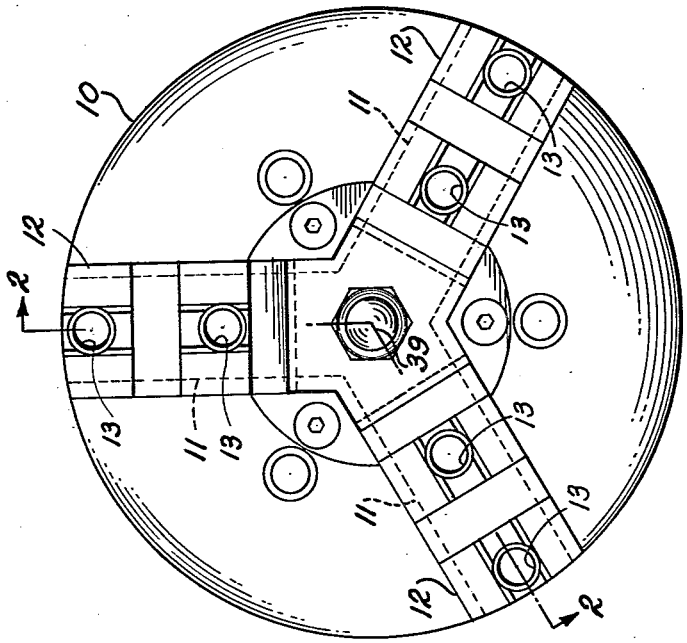
Fig. 1 is an end view of the preferred embodiment of this invention showing one form of jaw slide arrangement.

Referring first to Fig. 1 wherein the preferred embodiment of the invention is illustrated, the chuck embodies an annular body 10 provided with radial guides 11 having jaw slides 12 mounted for reciprocative movement therein. The radial guides 11 are interlocked with complementary recesses in the sides of the slides 12. A pair of tapped openings 13 in each slide 12 is provided for the attachment of a suitable jaw 12a (Fig. 6) for clamping a work piece.

Each jaw slide 12 is actuated by a bell crank 14 pivoted intermediate its ends upon a pin 16. The shorter arm 17 of the bell crank protrudes forwardly into a recess 18 in the lower face of the jaw slide 12, the arcuate side walls of the arm being continuously engaged with the opposed end walls of said recess. Pivotal movement of the bell crank 14 will, therefore, cause the slides 12 to move radially toward and away from the center of the chuck.

A sleeve or draw tube 19 is mounted for reciprocative movement in an axial bore 21 formed in the body 10. A collar having a flange 22 thereon is threaded on the rearward end of the sleeve 19 and is slidably engaged in the wall of the bore 21. A bolt 23 is mounted in a bore 24 in the sleeve 19, the headed end thereof being engaged with a shoulder 26 defined by a counterbore 27 in the outer end of the sleeve. A nut 28 is threaded on the bolt 23 in seated engagement with the rearward end of the sleeve 19. The nut 28 is restrained from rotation relative to the bolt 23 by a pin 28a extending through a cross-drilled opening in the nut 28 and the bolt 23. An extended portion 29 of the bolt 23 is provided to facilitate the engagement thereof with a piston rod from a power cylinder (not shown). The bolt may be coupled with the piston rod by rotating either the piston or the bolt 23. Reciprocation of the power cylinder or other motor will actuate the draw bar and sleeve 19 during the chucking operation.

The sleeve 19 is formed with a flange 31 at the forward end thereof which is machined for sliding engagement in the bore 21. The spaced flanges 22 and 31 define an annular groove in the sleeve and collar assembly for the support of a cam ring 33. The ring is machined with a bore therein which is larger than the outer diameter of the sleeve 19 in order to provide radial floating movement of the ring. A slight clearance is provided between the ring and flanges 22 and 31 to assure radial freedom of movement of the part. The magnitude of radial movement of the ring is governed by the difference in diameters of the bore of the ring 33, the outer diameter of the sleeve 19, and the clearance between the inner arm of the bell crank and contiguous face of the cam ring.

The cam surfaces on the outer wall of the cam ring 33 are formed to define a land 34 which is tapered inwardly in the order of ten to twenty-five degrees. The longer arm of the bell crank is bifurcated, the inner leg 35 thereof being formed to clear a flattened end portion 36 of the cam 33 adjacent the inner end of the land 34. A land angle of approximately fifteen degrees will frictionally retain the leg 35 of the bell crank in locked position. The chuck jaws are mounted on the slides 12 so that the work will be clamped when the legs 35 of the bell cranks are engaged with the tapered portion of the land 34 at points intermediate the ends thereof. Hence as the effect of centrifugual force tends to separate the jaws, the inner arms of the bell cranks will impinge the divergent portions of the lands and thus restrain radial movement of the slide and jaw assemblies. During such action the pressure exerted by the bell cranks upon the cam lands will effect the automatic radial adjustment of the ring, thereby assuring uniform clamping effort upon the work.

Figure 3:
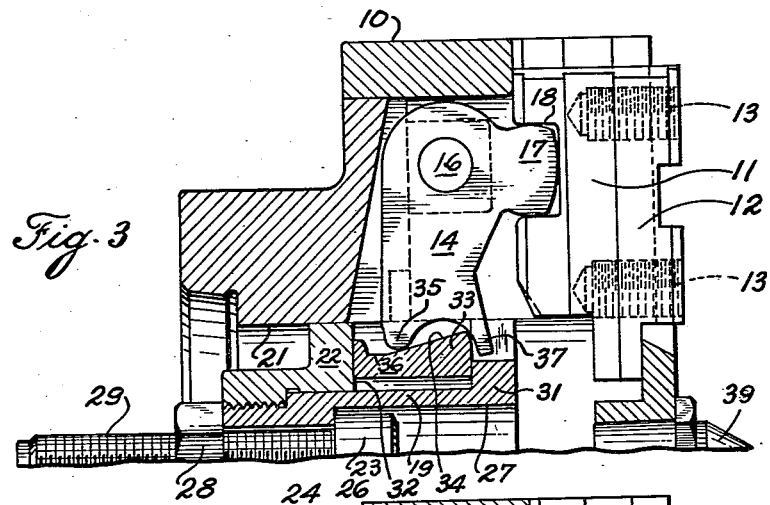
Fig. 3 is a partial sectional view similar to Fig. 2, showing the jaw slides and the operating mechanism in their retracted position.

Axial movement of the draw bar and sleeve 19 effects the translation of the cam ring 33 axially and brings the tapered portion of the cam into engagement with the legs 35, thus causing the operating bell cranks 14 to rotate about their fulcrums 16. The second ear 37 on the outer, longer arm of the bell crank spans the forward end of the cam 33 and engages the forward end of the cam ring when the sleeve 19 is moved outwardly to effect the distended position of the chuck jaws (see Fig. 3). A notch 38 for each of the longer arms of the bell cranks 14 is formed in the flange 31 to accommodate movement of the bell cranks and restrain rotation of the sleeve. A center 39 is mounted in the face of the body member 10 in its axis of rotation to position the work piece during the chucking operation. The center 39 cooperates with a live center (not shown) which supports the work piece while machining.

Figure 2:
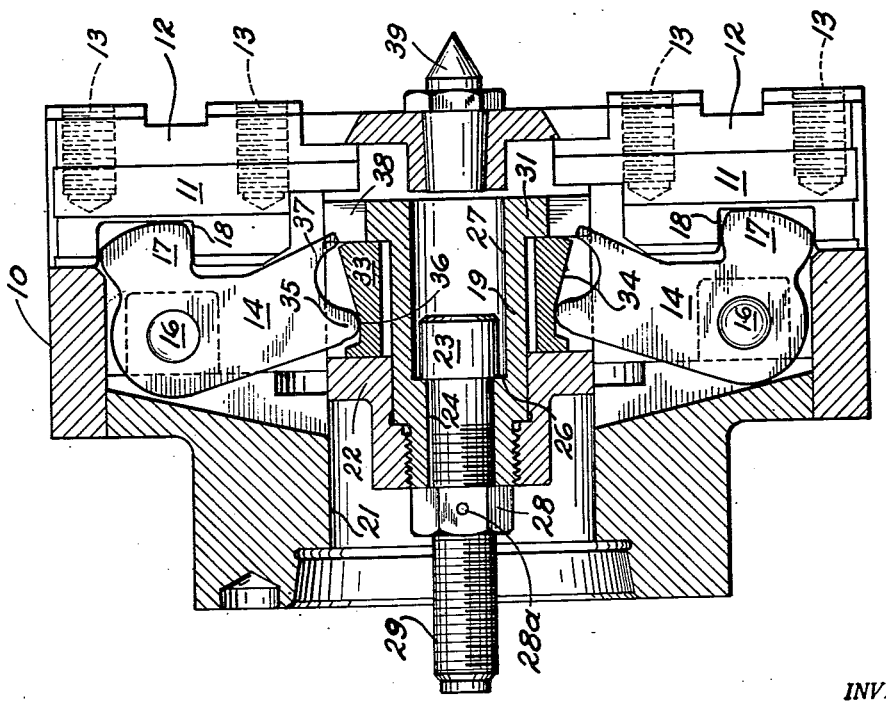
Fig. 2 is a sectional view taken along line 2—2 in Fig. 1, showing the operating mechanism when the jaw slides are in the released position.
Figure 4:
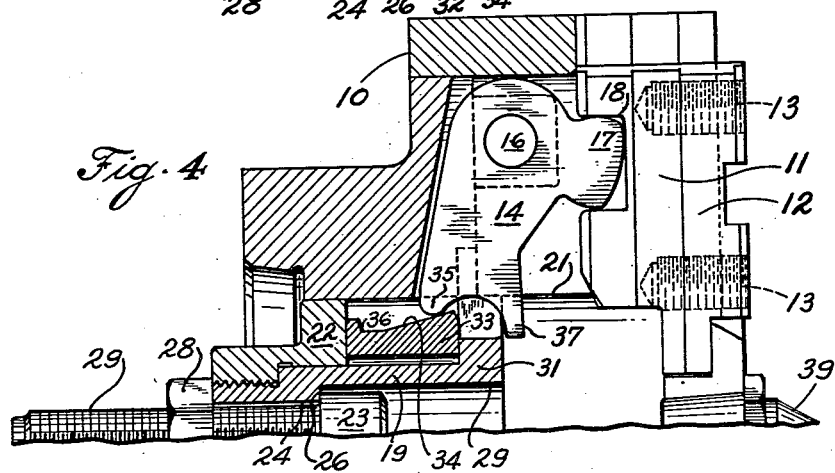
Fig. 4 is a partial sectional view similar to Fig. 2, showing the jaw slides and operating mechanism in their clamping position.

In operation, the work piece is held between centers with the chuck mechanism in the position shown in Fig. 2. The actuating means is then operated to retract the draw bar 23 and in turn, the sleeve 19 and the cam ring 33 inwardly. As the cam ring 33 moves into the position shown in Fig. 4, the arms 35 engage and travel along the tapered profile or lands 34 of the cam, thus rocking the bell cranks 14 and moving the slides 12 toward each other into chucking position. Reverse movement of the sleeve 19 brings the mechanism into the position shown in Fig. 3, which illustrates the end position of the chucking mechanism. In this position, the cam engages the legs 37 of the bell cranks and rotates the bell cranks to open the chuck jaws.

Figure 5:
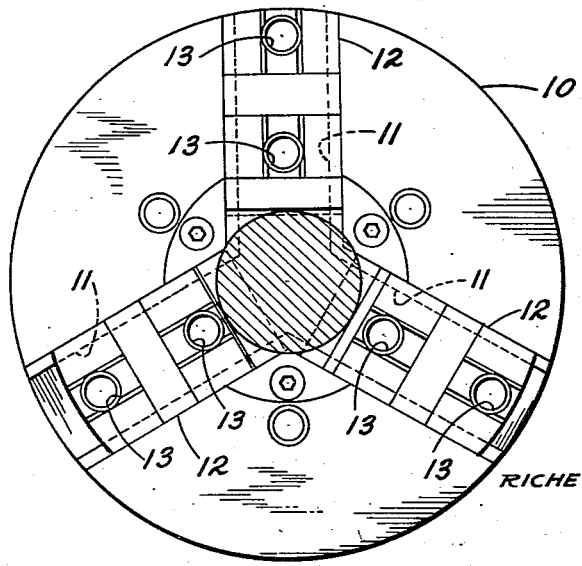
Fig. 5 is an end view of the chuck, illustrating diagrammatically the jaw slides in clamping position.

In Fig. 5, the jaw slides are shown in the position they would assume if the work were located in eccentric relation to its center. As the sleeve 19 is retracted, the first jaw to engage the work will come to rest. Further movement of the sleeve will cause the cam 33 to shift transaxially until the arms of the other bell cranks successively impinge the lands of the cam and move the jaws into clamped relation with the work. When the cam has shifted to a point where all of the arms have moved into work-engaging position, an equal stress on the operating arms will be imposed thereon by further movement of the cam, thereby clamping the work irrespective the irregular surface thereof.

Figure 6:
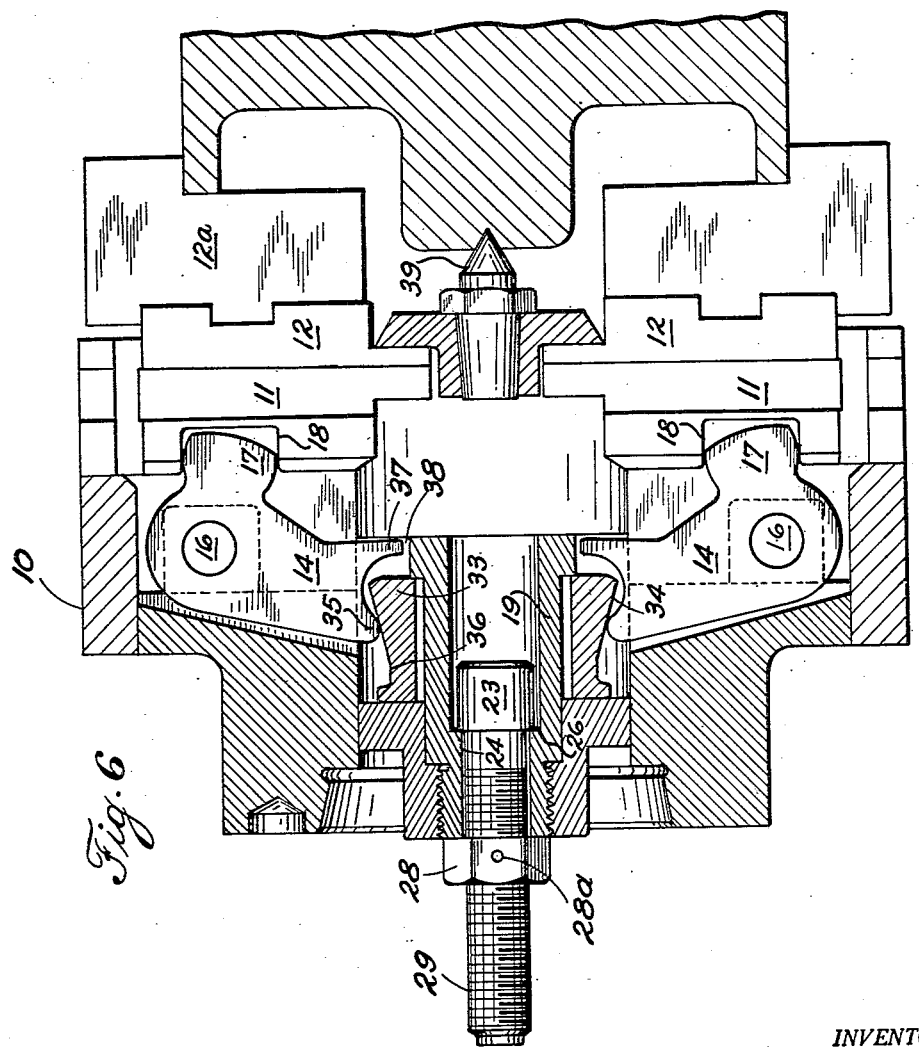
Fig. 6 is a cross-sectional view similar to Fig. 4 showing the chuck and the operating mechanism in another clamping position.

In Fig. 6 the operating mechanism of the chuck is shown in the optimum position for holding a slightly irregular work piece during a machining operation. In this position it will be noted that the cam ring 33 is disposed off center to accommodate the irregularity of the work piece and the arms 14 are in an intermediate position on the cam.

Should the cam ring 33 or portions of the lever mechanism wear, the cam will be automatically positioned to compensate for such change in dimensions of the operating structure, and the work will be held on the predetermined center irrespective such wear. This feature reduces the maintenance and the replacements required since the normal wear is compensated and the accuracy of the device remains constant although abrasion has occurred in the operating mechanism. Such extension of life is important in the automatic tool industry since the time a machine is down for repair is directly reflected in the cost of production.

Although the foregoing description is necessarily of a detailed character, in order that the invention may be completely set forth, it is to be understood that the specific terminology is not intended to be restrictive or confining; and that various rearrangements of parts and modifications of detail may be resorted to without departing from the scope or spirit of the invention as herein claimed.

What is claimed is:

1. A compensating chuck for holding a work piece, comprising a body, chuck jaws slidably mounted on said body, bell cranks pivoted in said body and coupled respectively with said jaws to effect radial movement thereof, a reciprocative pull rod in said body, a sleeve thereon, spaced flanges on said sleeve, a conical cam ring intermediate the flanges on said sleeve mounted for radial and rotational movement on the sleeve and axial movement between said flanges, arms on the inner ends of said bell cranks engaged with said cam for tightening said jaws upon a work piece, second arms on said bell cranks engageable with the outer end of said cam for retracting the jaws from the work piece, the angle between the conical surface of the cam ring and the first named arms of the bell cranks effecting the locked engagement of the parts when the jaws are disposed in clamping position.

2. A compensating chuck for holding a work piece, comprising a body, a plurality of jaws mounted on said body for radial movement towards and away from the center thereof, bell cranks pivotally mounted in said body, one arm of each bell crank being engaged with a jaw to effect the radial movement thereof, an axially reciprocative pull rod, spaced flanges thereon, a conical cam ring on said pull rod between said flanges arranged for radial, axial and rotative movement on said rod, one of the arms of said bell cranks being bifurcated and defining an inner leg engaged with the conical face of said cam ring and the outer leg of said arm being disposed in abutting relation with the forward end of said cam ring when the pull rod is moved to its forwardly disposed position the angle between the conical surface of the cam ring and the first named arms of the bell cranks effecting the locked engagement of the parts when the pull rod is disposed in its retracted position.

3. A compensating chuck for holding a work piece, comprising a body, chuck jaws slidably mounted on said body, bell cranks pivoted in said body and coupled respectively with said jaws to effect radial movement thereof, a reciprocative pull rod in said body, a sleeve thereon, spaced flanges on said sleeve, a conical cam ring mounted for full floating movement between said flanges and said sleeve, a leg on the inner arm of each of said bell cranks engaged with the conical face of said cam ring and a second leg on the inner end of each bell crank arranged in abutting engagement with the end of the cam ring when the pull rod is moved to its distended position, whereby the floating cam ring will impose uniform pressure on each bell crank when the chuck jaws engage irregularities in the surface of a work piece and will release the chuck jaws from the work piece when the pull rod is moved to its retracted position.

References Cited in the file of this patent

UNITED STATES PATENTS

| | | |
|---|---|---|
| 547,643 | Krug | Oct. 8, 1895 |
| 1,130,768 | Schultz | Mar. 9, 1915 |
| 1,446,060 | Pratt | Feb. 20, 1923 |
| 1,713,978 | Olson | May 21, 1929 |
| 1,829,619 | Svenson | Oct. 27, 1931 |

FOREIGN PATENTS

| | | |
|---|---|---|
| 660,950 | Germany | June 7, 1938 |